(12) United States Patent
Baker et al.

(10) Patent No.: US 7,668,407 B1
(45) Date of Patent: Feb. 23, 2010

(54) CONTEXTUAL RESOLUTION OF CHARACTER ASSIGNMENTS

(75) Inventors: Billy S. Baker, Lily, KY (US); Gary S. Smith, Barbourville, KY (US)

(73) Assignee: Affiliated Computer Services, Inc., Dallas, TX (US)

( * ) Notice: Subject to any disclaimer, the term of this patent is extended or adjusted under 35 U.S.C. 154(b) by 538 days.

(21) Appl. No.: 10/856,312

(22) Filed: May 28, 2004

(51) Int. Cl.
*G06K 7/10* (2006.01)
*G06K 9/20* (2006.01)

(52) U.S. Cl. .................... 382/321; 382/182; 382/187
(58) Field of Classification Search .............. 382/182, 382/187, 321; 434/159; 706/20; 725/19
See application file for complete search history.

(56) References Cited

U.S. PATENT DOCUMENTS

| | | | | |
|---|---|---|---|---|
| 4,164,025 A | * | 8/1979 | Dubnowski et al. | 715/210 |
| 5,159,667 A | * | 10/1992 | Borrey et al. | 715/205 |
| 5,563,959 A | * | 10/1996 | Gallo et al. | 382/187 |
| 5,970,170 A | * | 10/1999 | Kadashevich et al. | 382/187 |

FOREIGN PATENT DOCUMENTS

| | | | | |
|---|---|---|---|---|
| JP | 62247484 A | * | 10/1987 | |
| JP | 07160820 A | * | 6/1995 | |

\* cited by examiner

*Primary Examiner*—Andrew W Johns
*Assistant Examiner*—Gregory F Cunningham
(74) *Attorney, Agent, or Firm*—Fish & Richardson P.C.

(57) ABSTRACT

A character on which character recognition is being performed resides in one or more character strings, at least one of which excludes a subset of characters from a character set. In selecting character assignments for the character, one or more of multiple proposed character assignments for the character are eliminated as being a character in a subset of excluded characters.

40 Claims, 3 Drawing Sheets

| | | | | | | | | |
|---|---|---|---|---|---|---|---|---|
| | | | | | | 01 09 1986 | | |
| | | | | | | U | | |
| | | | | | | NHIC-TRAD-MEDICAL | | |
| | | | | | | X | | |
| SIGNATURE ON FILE | | NOVEMBER 20, 2003 | | | | SIGNATURE | | |
| 11 06 03 | | | | | | | | |
| JOHNATHAN M. DOE, DO | | E09843 | 11 1 | T1015 U7 | | 1 | 5900 | |
| 11 20 03 | | | | | | | | 3400 |
| 11 20 03 | | | | | | | | 1 |
| 75-1528614 | | 6124102 | X | CITY MEDICAL CENTER 411 MAIN STREET DALLAS, TX 75401 | | X | COMMUNITY HEALTH SVCS. 114 COMMERCE AUSTIN, TX 75401 | |
| JOHNATHAN M. DOE, D.O. | | | | | | | | |

FIG. 4

CONTEXTUAL RESOLUTION OF CHARACTER ASSIGNMENTS

TECHNICAL FIELD

This disclosure relates to automated character recognition, and more particularly to resolving character assignments in automated character recognition.

BACKGROUND

An automated character recognition system, such as an optical character recognition (OCR) system, may be presented with characters in different fonts or handwriting, of poor print quality, and at a slant relative to the image axis. These inconsistencies introduce uncertainty in the character assignments made by the automated character recognition system. In some instances the system may not be able to positively distinguish between a particular character and a different character whose geometry is different but that is roughly similar. As a result, the automated character recognition system may incorrectly identify a character (i.e. make an error in selecting the correct character assignment) or may require the character assignment be made by human intervention. To improve the efficiency of automated character recognition, it is desirable to improve the ability of the automated character recognition system to distinguish characters having similar geometry.

SUMMARY

The invention is drawn to a technique of character recognition that can be used to improve the ability of an automated character recognition system to distinguish characters having similar geometry.

One illustrative implementation includes a technique of character recognition. According to the described techniques, multiple proposed character assignments for a character on which character recognition is being performed are received. The character resides in one or more character strings at least one of which excludes a subset of characters from a character set. At least one of the proposed character assignments is eliminated as being a character in the subset of excluded characters.

The subset of characters excluded by a character string can be determined at least in part from information conveyed by the character string. At least two character strings can exclude different subsets of characters. In some instances, all but one proposed character assignment can be eliminated and the illustrative method can include selecting a character assignment for the character as the remaining proposed character assignment.

The described techniques can be implemented in digital electronic circuitry, integrated circuitry, or in computer hardware, firmware, software, or in combinations thereof. Apparatus for carrying out the techniques can be implemented in a software product (e.g., a computer program product) tangibly embodied in a machine-readable storage device for execution by a programmable processor; and processing operations can be performed by a programmable processor executing a program of instructions to perform the described functions by operating on input data and generating output. The techniques can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

The details of one or more implementations of the invention are set forth in the accompanying drawings and the description below. Other features will be apparent from the description and drawings, and from the claims.

DESCRIPTION OF DRAWINGS

FIG. 2 is an illustrative image of a document according to an implementation of the invention;

Like reference symbols in the various drawings indicate like elements.

DETAILED DESCRIPTION

Figure 1:
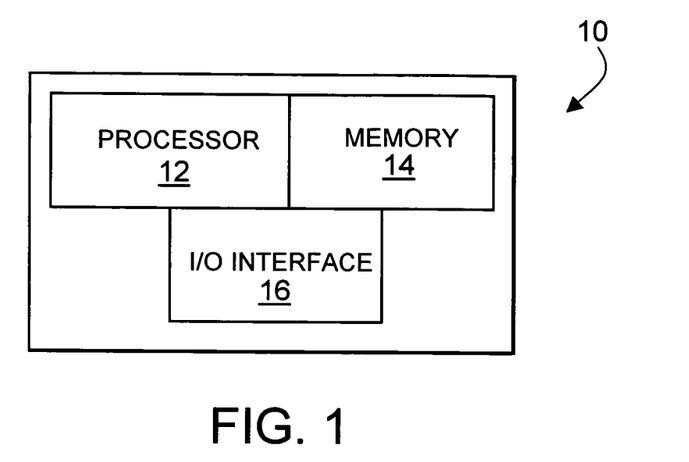
FIG. 1 is a schematic of an illustrative optical character recognition system according to an implementation of the invention.

Referring first to FIG. 1, an illustrative optical character recognition (OCR) system 10 according to an implementation of the invention includes a processor 12 coupled to a computer readable media (hereinafter "memory 14") and an input/output (I/O) interface 16. The processor 12 is operable to communicate with the memory 14 and the I/O interface 16, and to operate as a character recognition engine according to the methods described herein. The memory 14 is operable to store information for use by the processor 12 in performing the methods described herein. For example, the stored information can be instructions for use by the processor in operating as a character recognition engine according to the methods described herein. The I/O interface 16 can include one or more interface types operable to communicate information from outside of the system 10 to the processor 12 or memory 14 and vice versa. The I/O interface 16 can include provisions for digitizing an image, such as an image scanner (not specifically shown), or can be adapted to receive a digitized image from outside of the system 10. Other exemplary I/O interfaces that can be provided in the I/O interface 16 include electrical or optical data communication ports, radio frequency transponders, infrared transmitters and receivers, audio speakers and microphones, displays, keypads, and numerous other devices operable to communicate information to and from the system 10.

Although depicted schematically as a single processor 12 in the figures, it is anticipated that the processor 12 can include multiple processors residing in a single location within the system 10 or distributed about the system 10. Likewise, the memory 14, depicted schematically as a single memory 14, can be one or more memories residing in a single location within the system 10 or distributed about the system 10, for example, distributed between residing within and outside of the processor 12. Further, the memory 14 can be fixed in the system 10 or be wholly or partially removable from the system 10, for example, in the form of RAM, ROM, floppy disk, optical disk, hard drive and numerous other forms of storing information.

The OCR system 10 is adapted to receive and digitize a document or to receive an image, such as an image of a digitized document, on which character recognition will be performed. An illustrative image 20 of a digitized document is depicted in FIG. 2; however, it is anticipated that the OCR system 10 can be used in performing character recognition on other types of images, such as characters that have been generated into a graphic file format (versus generated into a standard character code format such as ASCII), a digital photograph, a screen capture, or numerous other images that include characters.

The image can include one or more groupings of characters, referred to herein as character strings 22. The character strings 22 can be arranged on the image in one or more fields 24. Each field 24 can contain one or more character strings 22 conveying certain information. For example, one field 24 may contain character strings 22 that convey a date, while another field 24 may contain character strings 22 that convey a name or name and address. The illustrative image 20 has several fields 24. Those that will be used in discussing the operation of the OCR system 10 include a specified content field 24a, an alphanumeric date field 24b, a numeric date field 24c, a name field 24d, and an alphanumeric case identifier field 24e.

The character strings 22 can be categorized as a function of the information conveyed by the character string 22 as either exclusive character strings or open character strings. An exclusive character string is a character string 22 that is specified to exclude particular characters. An open character string is a character string 22 that is not exclusive to any characters contained in the character set and can be non-exclusive to all characters. An exclusive character string may exclude particular types of characters, for example, numeric characters, alpha characters, punctuation characters, special characters, or numerous other types of characters. An exclusive character string may alternately or also exclude characters outside of a particular subset. For example, a character string 22 conveying an alpha month (i.e. January, February, March, etc.) can be specified to exclude characters not in a subset of characters used in spelling the months (e.g. "z", "q" or "w"). In other words, a character string 22 containing a specified subset of characters can be characterized as exclusive to all other characters outside of the specified subset.

The illustrative image 20 includes several exemplary exclusive character strings 22. Character string 22a resides in specified content field 24a that will be empty or will contain the string "SIGNATURE ON FILE." Therefore, character string 22a is exclusive to characters outside of the subset necessary to spell out "SIGNATURE ON FILE" in all caps. Character string 22b represents the month in the alphanumeric date field 24b; and therefore, is exclusive to characters outside of the subset of characters necessary to spell out the months of a year. Character string 22c represents the day and year in the alphanumeric date field 24b, and can be characterized as alpha exclusive having no alpha characters. Character string 22d resides in a numeric date field 24c and can be characterized as alpha exclusive having no alpha characters. Character string 22e is the first name in name field 24d and can be characterized as numeric and punctuation exclusive having no numeric characters and no punctuation. Character string 22f resides in the case identifier field 24e and represents an open character string.

The information conveyed by one or more fields 24 or character strings 22 can be provided to the OCR system 10, and the system 10 may use this information to determine the nature of the character strings 22 as open or exclusive and the characters that the character strings 22 exclude. For example, an alphanumeric date field, such as field 24b, can be determined to have a specified content character string 22b representing the month in the alphanumeric date field 24b (i.e. exclusive to characters outside of the subset necessary to spell out the months of a year) and an alpha exclusive character string 22c representing the day and year. Alternately, or in combination with determining the nature (open or exclusive) and exclusivity of the character strings 22, the nature (open or exclusive) and exclusivity of one or more the character strings 22 can be specified to the OCR system 10.

The OCR system 10 is provided with or determines the location of character strings 22, including at least one exclusive character string, and in some instances the location of at least one open character string, for a particular image or for a group of images having similar formats. For example, the illustrative image 20 of FIG. 2 is a form document having specified fields 24 arranged about the document. In the case of such a form document, it is likely that the OCR system 10 will encounter the same form document repeatedly. Therefore, information concerning the location of at least one exclusive character string is applicable to all images following the same form. Of note, a document need not be arranged in the tabular arrangement depicted in the illustrative image 20 to be a form document. Other document formats have specified types of information arranged in fields (demarcated by lines or not). For example, a letter following a standardized letter format will include address information, a greeting, the body of the letter, and a closing arranged in predictable regions of the image (i.e. fields).

Figure 3:
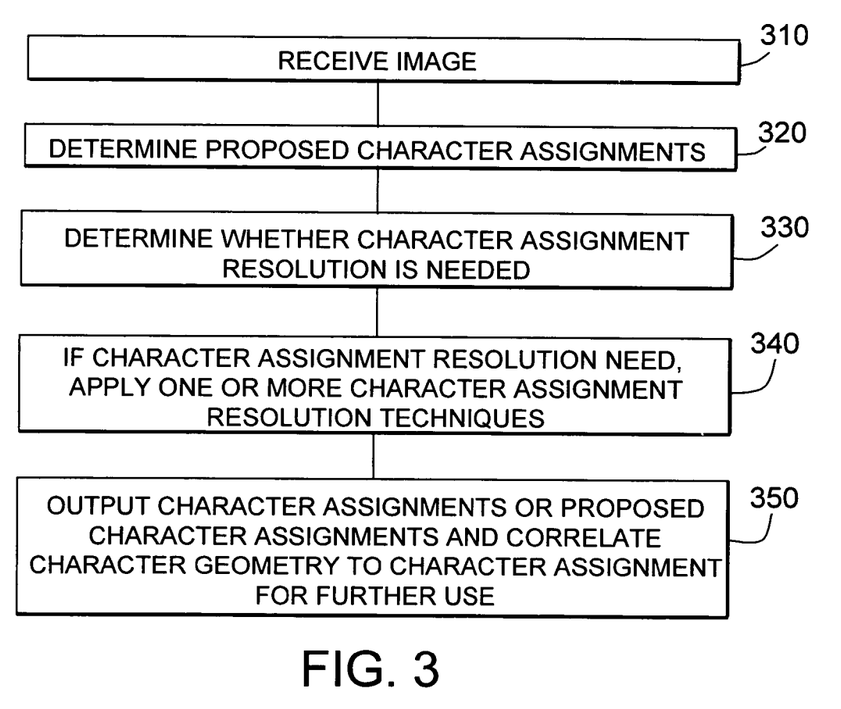
FIG. 3 is a flow diagram of the operation of an illustrative OCR system according to an implementation of the invention.

FIG. 3 depicts a flow diagram of the operation of the illustrative OCR system according to an embodiment of the invention. At block 310, the OCR system receives an image on which character recognition will be performed. The OCR system may operate to produce the image itself, for example by scanning a document, or the OCR system may receive an image produced by a separate system, for example a dedicated scanning system. At block 320, the OCR system performs character recognition on the image, such as illustrative image 20 (FIG. 2), and yields one or more proposed character assignments for each character on which the recognition was performed and a confidence level for each character assignment. The character assignment is the coded representation of the character. The confidence level represents the probability that the corresponding character assignment accurately represents the character that was read. The OCR system may perform the task of block 320 for all the characters on which recognition will be performed, or may perform the task of block 320 for a sub-grouping of the characters on which recognition will be performed, continue on to the tasks of 330-350, and repeatedly return to and begin again at the task of block 320 for each subsequent sub-grouping of characters.

If more than one proposed character assignment is made for a given character or if a proposed character assignment has a low confidence level, at block 330, the OCR system may determine that a character assignment resolution technique should be applied to resolve the correct character assignment. The techniques are numerous and vary from application to application; however, in the illustrative OCR system, one such technique can be referred to as "context assignment resolution." Context assignment resolution involves resolving multiple proposed character assignments for a given character based on known or derived information about the content of one or more character strings.

At block 340, the OCR system applies one or more character assignment resolution techniques, as needed, in determining a character assignment for the characters. If a character assignment resolution is not necessary or if a character assignment resolution yields a single character assignment, the character assignment is output at block 350. If no single character assignment can be made, the proposed character assignments are output at block 350. In either instance, the OCR system may output additional information about results of the character recognition at block 350, including for example, confidence levels for one or more of the character assignments.

The OCR system may determine or an operator may specify to the OCR system which character assignment resolution technique or techniques to apply to particular fields or character strings. For example, an operator may anticipate character resolution difficulties with the character strings of particular fields 24 or with particular character strings 22 of a field 24 and not others, and determine and specify to the OCR system which character resolution techniques to apply to the fields 24 or the particular character strings 22.

Context assignment resolution can be determined applicable if a character string is expected to contain a character that is difficult for the OCR system to distinguish from another character, for example, because the geometry of the character is roughly similar to the geometry of another character. Some examples of characters with roughly similar geometry are "0" (zero) and "O" (oh); "1" (one), "i" (i), and "l" (el); "8" (eight) and "B" (be); and "5" (five) and "S" (es). Context assignment resolution can also, or alternately, be determined applicable to a character string when more than one proposed character assignment has been made for a character in the character string.

Figure 4:
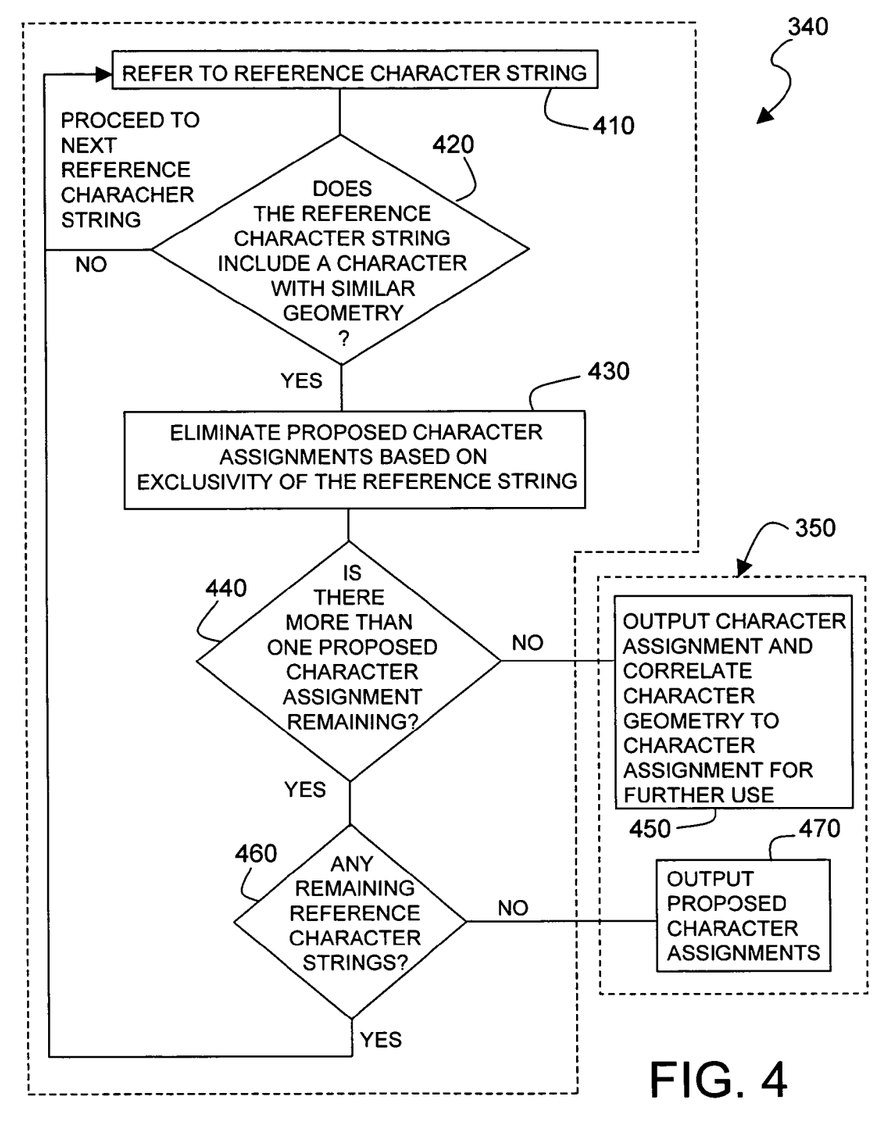
FIG. 4 is a flow diagram of the operation of an illustrative OCR system in performing context character assignment resolution.

FIG. 4 depicts a flow diagram of an illustrative context assignment resolution technique, for example, as performed by the illustrative OCR system in block 340 of FIG. 3. In context assignment resolution, a multiple proposed character assignment is resolved based on information about the content of one or more character strings in the image or other related or similar images. At block 410, reference is made to an exclusive character string that will be used as a reference character string. As will be apparent below, repeated operation of blocks 410-460 using different reference character strings may be required to resolve a given multiple proposed character assignment. Particular exclusive character strings or fields containing exclusive character strings for use as reference character strings can be specified, for example by an operator or by the OCR system as is described below, for use in resolving a given multiple character assignment. Likewise, the order in which the reference character strings are to be referenced can be specified. It should be noted that the task of specifying fields or specific character strings can occur at any time prior to block 410, for example, prior to receiving the image (block 310, FIG. 3) or prior to determining if character assignment resolution is needed (block 330, FIG. 3). In one instance, the first reference character string may be the character string containing the character for which the context assignment resolution is being performed. It is important to note that in some instances, the reference character strings may reside in the same image; however, it is within the scope of the invention that one or more of the reference character strings be distributed across more than one image, for example, on multiple related images, unrelated images from the same source, or otherwise.

At block 420 the reference character string is checked for occurrences of characters having the same geometry (or closely similar geometry to account for slight printing or digitizing inconsistencies) to that of the character for which the context assignment resolution is being performed. If there is no character having the same or closely similar geometry, operation returns to block 410 to begin the technique again using another reference character string. If the reference character string is the character string containing the character on which context assignment resolution is being performed, the task at block 420 can be omitted and the operation can proceed to block 430. If a character having the same or closely similar geometry is found, the operation proceeds to block 430.

At block 430, the exclusivity of the reference character string is compared to the proposed character assignments to determine which, if any, proposed character assignments would be excluded by the exclusivity of the reference character string. If one or more of the character assignments is excluded by the exclusivity of the reference character string, the excluded proposed character assignments are eliminated.

At block 440, if the proposed character assignments are reduced to a single proposed character assignment, the character assignment is made as the remaining proposed character assignment and output at block 450. If the proposed character assignments are not reduced to a single character assignment, the operation proceeds to block 460.

In each instance that a proposed character assignment is eliminated, whether the proposed character assignments were reduced to a single character assignment or not, the eliminated character assignments are used to better define the character for which the assignment resolution is being performed. In other words, the geometry of the character is disassociated with the eliminated proposed character assignments for later use in determining proposed character assignments for the character. If the proposed character assignments are resolved to a single character assignment, the geometry of the character is thereafter associated with the single character assignment.

At block 460, if there are other reference character strings specified for the character assignment resolution that have not yet been used (ex. one or more other exclusive character strings), the operation proceeds to the next reference character string and returns to block 410. If there are no other reference character strings, the OCR system outputs the remaining proposed character assignments at block 470. The OCR system may subsequently apply different character assignment resolution techniques to resolve the remaining proposed character assignments or the resolution may be made by operator intervention.

By way of example, in a multiple proposed character assignment including an "O" (oh) and a "0" zero, the OCR system may look to the reference character string to find a character with the same or similar geometry to the character for which character assignments were proposed. If the reference character string is numeric exclusive (i.e. excluding numeric characters), then the numeric character assignment "0" (zero) can be eliminated. If "O" (oh) and "0" (zero) are the only two proposed character assignments, the character assignment is resolved to the alpha character "O" (oh). If the reference character string is alpha exclusive (i.e. excluding alpha characters), then the alpha character assignment "O" (oh) can be eliminated and the character assignment resolved to the numeric character "0" (zero). If the exclusivity of reference character string does not exclude either "O" (oh) or "0" (zero), or if the reference character string does not contain a character having a similar geometry to the character on which the context resolution is being performed, the OCR system refers to another reference character string and repeats the process.

The selection of the fields or character strings used in resolving proposed character assignments can be based on the particular character assignment resolution that is encountered, or expected to be encountered. In one instance, the selected fields or character strings can be those likely to have the exclusivity to enable, or at least further, a determination of the character's identity. For example, if a proposed character assignment for an "O" (oh) character on image 20 (FIG. 2) returns both an "O" (oh) and a "0" (zero), one of the reference fields can be selected to be the specified content field 24a. Field 24a is likely to have an "O" (oh), because it is specified that the field 24a will be empty or will contain the character string "SIGNATURE ON FILE." If the field 24a contains the "SIGNATURE ON FILE" character string, then the OCR system will match the geometry of the character for which it is performing assignment resolution to the "O" (oh) character, note that the field 24a excludes numeric characters, eliminate the proposed "0" (zero) character assignment, and resolve the character assignment to the "O" (oh) character. The OCR system will thereafter associate the geometry of an "O" (oh) with the "O" (oh) character assignment. If field 24a does not contain an "O" (oh), then reference can be made to other fields or character strings until the character assignment can be made or no further proposed character assignments can be eliminated.

A number of embodiments of the invention have been described. Nevertheless, it will be understood that various modifications may be made without departing from the spirit and scope of the invention. For example, instead of concentrating on resolving the instant character assignment as is described herein, the OCR system may log the unresolved character assignment in a cumulative list of unresolved character assignments, and continue addressing other character assignments while also reviewing character strings for the exclusivity and one or more of the proposed character assignments to resolve unresolved character assignments in the cumulative list. Accordingly, other embodiments are within the scope of the following claims.

What is claimed is:

1. A computer-implemented method of optical character recognition, comprising:
    receiving at a computer a plurality of proposed character assignments for at least one instance of a character in an image on which optical character recognition is being performed, each of the character assignments representing a character determined from a character set for the at least one instance of the character by the optical character recognition, the at least one instance of the character residing in one or more multi-character character strings, at least one of the multi-character character strings known to exclude a subset of at least one character from the character set based at least in part on the at least one multi-character string's location in the image; and
    eliminating at least one of the proposed character assignments by comparing the at least one of the proposed character assignments to the subset of at least one character excluded from the at least one multi-character character string.

2. The method of claim 1 wherein the subset of characters comprises at least one of alpha characters, numeric characters, punctuation characters, special characters, or a specified subset of characters.

3. The method of claim 1 wherein at least two multi-character character strings exclude different subsets of characters.

4. The method of claim 1 further comprising determining the subset of at least one character excluded by a multi-character character string at least in part from information conveyed by the multi-character character string.

5. The method of claim 1 wherein the character on which optical character recognition is being performed is contained in a field conveying particular information; and
    further comprising determining the subset of at least one character excluded by a multi-character character string at least in part from information conveyed by the field.

6. The method of claim 1 further comprising selecting a character assignment for the character from the remaining proposed character assignments.

7. The method of claim 1 wherein eliminating at least one of the proposed character assignments comprises eliminating all but one proposed character assignment; and
    the method further comprising selecting a character assignment for the character as the remaining proposed character assignment.

8. The method of claim 7 further comprising associating a geometry of the character with the character assignment for use in subsequent character recognition.

9. The method of claim 1 wherein eliminating at least one of the proposed character assignments by comparing the at least one of the proposed character assignments to the subset of at least one character excluded from the at least one multi-character character string comprises:
    referring to a first multi-character character string known to exclude a first subset of at least one character;
    eliminating at least one of the proposed character assignments by comparing the at least one of the proposed character assignments to the first subset of at least one character excluded from the first multi-character character string;
    referring to a second multi-character character string known to exclude a second subset of at least one character; and
    eliminating at least one of the proposed character assignments by comparing the at least one of the proposed character assignment to the second subset of at least one character excluded from the second multi-character character string.

10. An article comprising a machine-readable medium storing instructions adapted to cause one or more machines to perform operations comprising:
    receiving a plurality of proposed character assignments for at least one instance of a character in an image on which optical character recognition is being performed, each of the character assignments representing a character determined from a character set for the at least one instance of the character by the optical character recognition, the at least one instance of the character residing in one or more character strings of multiple characters, at least one of the character strings of multiple characters known to exclude a subset of at least one character from the character set based at least in part on the at least one character string of multiple characters' location in the image; and
    eliminating at least one of the proposed character assignments by comparing the at least one of the proposed character assignments to the subset of at least one character excluded from the at least one character string of multiple characters.

11. The article of claim 10 wherein the specified subset of characters comprises at least one of alpha characters, numeric characters, punctuation characters, or special characters.

12. The article of claim 10 wherein the instructions are further adapted to cause one or more machines to perform operations comprising:

determining the subset of at least one character excluded by a character string of multiple characters at least in part from information conveyed by the character string of multiple characters.

13. The article of claim 10 wherein the character on which optical character recognition is being performed is contained in a field conveying particular information; and wherein the instructions are further adapted to cause one or more machines to perform operations comprising determining the subset of at least one character excluded by a character string of multiple characters at least in part from information conveyed by the field.

14. The article of claim 10 wherein the instructions are further adapted to cause one or more machines to perform operations comprising selecting a character assignment for the character from the remaining proposed character assignments.

15. The article of claim 14 wherein the instructions are further adapted to cause one or more machines to perform operations comprising associating a geometry of the character with the character assignment for use in subsequent character recognition.

16. The article of claim 10 wherein eliminating at least one of the proposed character assignments by comparing the at least one of the proposed character assignments to the subset of at least one character excluded from the at least one character string of multiple characters comprises:

referring to a first character string of multiple characters known to exclude a first subset of at least one character;

eliminating at least one of the proposed character assignments by comparing the at least one of the proposed character assignments to the first subset of at least one character excluded from the first character string of multiple characters;

referring to a second character string of multiple characters known to exclude a second subset of at least one character; and eliminating at least one of the proposed character assignments by comparing the at least one of the proposed character assignments to the first subset of at least one character excluded from the second character string of multiple characters.

17. A system for optical character recognition including a processor configured to perform operations comprising:

receiving a plurality of proposed character assignments for at least one instance of a character in an image on which optical character recognition is being performed, each of the character assignments representing a character determined from a character set for the at least one instance of the character by the optical character recognition, the at least one instance of the character residing in one or more character strings of a plurality of characters, at least one of the character strings of a plurality of characters known to exclude a subset of at least one character from the character set based at least in part on the at least one character string of a plurality of characters' location in the image; and eliminating at least one of the proposed character assignments by comparing the at least one of the proposed character assignments to the subset of at least one character excluded from the at least one character string of a plurality of characters.

18. The system of claim 17 wherein the specified subset of characters comprises at least one of alpha characters, numeric characters, punctuation characters, or special characters.

19. The system of claim 17 wherein the processor is further configured to perform operations comprising determining the subset of at least one character excluded by a character string of a plurality of characters at least in part from information conveyed by the character string of a plurality of characters.

20. The system of claim 17 wherein the character on which optical character recognition is being performed is contained in a field conveying particular information; and wherein the processor is further configured to perform operations comprising determining the subset of at least one character excluded by a character string of a plurality of characters at least in part from information conveyed by the field.

21. The system of claim 17 wherein the processor is further configured to perform operations comprising selecting a character assignment for the character from the remaining proposed character assignments.

22. The system of claim 21 wherein the processor is further configured to perform operations comprising associating a geometry of the character with the character assignment for use in subsequent character recognition.

23. The system of claim 17 wherein eliminating at least one of the proposed character assignments by comparing the at least one of the proposed character assignments to the subset of at least one character excluded from the at least one character string of a plurality of characters comprises:

referring to a first character string of a plurality of characters known to exclude a first subset of at least one character;

eliminating at least one of the proposed character assignments by comparing the at least one of the proposed character assignments to the first subset of at least one character excluded from the first character string of a plurality of characters;

referring to a second character string of a plurality of characters excluding known to exclude a second subset of at least one character; and eliminating at least one of the proposed character assignments by comparing the at least one of the proposed character assignments to the second subset of at least one character excluded from the second character string of a plurality of characters.

24. A computer-implemented method of optical character recognition, comprising:

receiving at a computer a plurality of proposed character assignments for at least one instance of a character in an image on which optical character recognition is being performed, the at least one instance of the character residing on an image, each character assignment representing a character determined from a character set for the at least one instance of the character by the optical character recognition;

referring to a multiple-character reference character string containing the at least one instance of the character or another instance of the character and the reference character string known to exclude a subset of one or more characters of the character set based at least in part on the reference character string's location in the image; and eliminating at least one of the plurality of proposed character assignments by comparing the at least one of the proposed character assignments to the subset of one or more characters known to be excluded by the reference character string.

25. The method of claim 24 further comprising:

referring to a second multiple-character reference character string containing another instance of the character and the second reference character string known to exclude a second subset of one or more characters of the character set based at least in part on the second reference character string's location in the image; and eliminating at least one of the plurality of proposed character assignments by comparing the at least one of the proposed character assignments to the second subset of one or more characters known to be excluded by the second reference character string.

26. The method of claim 24 wherein the multiple-character reference character string resides on a second image.

27. The method of claim 24 wherein eliminating at least one of the plurality of proposed character assignments comprises eliminating all but one of the plurality of proposed character assignments; and further comprising selecting a character assignment as the remaining proposed character assignment.

28. The method of claim 27 further comprising associating a geometry of the character with the character assignment for determining subsequent character assignments.

29. The method of claim 1 wherein the image comprises a specified format comprising a plurality of fields, and further wherein the at least one multi-character string's location in the image used to determine the excluded subset of at least one character from the character set comprises the at least one multi-character string's location in a particular one of the plurality of fields.

30. The method of claim 1 wherein the location of the at least one multi-character string in the image used to determine the excluded subset of at least one character from the character set comprises the location of the at least one multi-character string relative to at least one other multi-character string in the image.

31. The method of claim 1 wherein the image comprises a digitized document.

32. The article of claim 10 wherein the image comprises a specified format comprising a plurality of fields, and further wherein the at least one character string of multiple characters' location in the image used to determine the excluded subset of at least one character from the character set comprises the at least one character string of multiple characters' location in a particular one of the plurality of fields.

33. The article of claim 10 wherein the location of the at least one character string of multiple characters in the image used to determine the excluded subset of at least one character from the character set comprises the location of the at least one character string of multiple characters relative to at least one other character string of multiple characters in the image.

34. The article of claim 10 wherein the image comprises a digitized document.

35. The system of claim 17 wherein the image comprises a specified format comprising a plurality of fields, and further wherein the at least one character string of a plurality of characters' location in the image used to determine the excluded subset of at least one character from the character set comprises the at least one character string of a plurality of characters' location in a particular one of the plurality of fields.

36. The system of claim 17 wherein the location of the at least one character string of a plurality of characters in the image used to determine the excluded subset of at least one character from the character set comprises the location of the at least one character string of a plurality of characters relative to at least one other character string of a plurality of characters in the image.

37. The system of claim 17 wherein the image comprises a digitized document.

38. The method of claim 24 wherein the image comprises a specified format comprising a plurality of fields, and further wherein the reference character string's location in the image used to determine the excluded subset of at least one character from the character set comprises the reference character string's location in a particular one of the plurality of fields.

39. The method of claim 24 wherein the location of the reference character string in the image used to determine the excluded subset of at least one character from the character set comprises the location reference character string relative to at least one other reference character string.

40. The method of claim 24 wherein the image comprises a digitized document.

* * * * *

UNITED STATES PATENT AND TRADEMARK OFFICE
CERTIFICATE OF CORRECTION

PATENT NO. : 7,668,407 B1
APPLICATION NO. : 10/856312
DATED : February 23, 2010
INVENTOR(S) : Billy S. Baker It is certified that error appears in the above-identified patent and that said Letters Patent is hereby corrected as shown below:

In column 10, line 34, before "known" delete "excluding".

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,668,407 B1
APPLICATION NO. : 10/856312
DATED : February 23, 2010
INVENTOR(S) : Baker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Seventh Day of December, 2010

David J. Kappos
*Director of the United States Patent and Trademark Office*